United States Patent
Chao et al.

(10) Patent No.: US 12,112,616 B2
(45) Date of Patent: Oct. 8, 2024

(54) HAPTIC FEEDBACK SYSTEM

(71) Applicant: TDK Taiwan Corp., Taoyuan (TW)

(72) Inventors: Ko-Lun Chao, Taoyuan (TW);
Liang-Ting Ho, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 359 days.

(21) Appl. No.: 17/576,457

(22) Filed: Jan. 14, 2022

(65) Prior Publication Data

US 2022/0230516 A1    Jul. 21, 2022

Related U.S. Application Data (60) Provisional application No. 63/137,968, filed on Jan. 15, 2021.

(51) Int. Cl.
*G08B 6/00* (2006.01)

(52) U.S. Cl.
CPC ...................................... *G08B 6/00* (2013.01)

(58) Field of Classification Search
CPC ............ G08B 6/00; H02K 33/16; G06F 3/016
See application file for complete search history.

(56) References Cited

U.S. PATENT DOCUMENTS

| | | | | |
|---|---|---|---|---|
| 2017/0070131 A1* | 3/2017 | Degner | ................... | H02K 33/00 |
| 2018/0021812 A1* | 1/2018 | Akanuma | .............. | H02K 33/00 |
| | | | | 310/25 |

FOREIGN PATENT DOCUMENTS

WO    WO-2022006844 A1 *   1/2022

\* cited by examiner

*Primary Examiner* — Quan Zhen Wang
*Assistant Examiner* — Rajsheed O Black-Childress
(74) *Attorney, Agent, or Firm* — MUNCY, GEISSLER, OLDS & LOWE, PC (57) ABSTRACT

The present disclosure provides a haptic feedback system including a movable part, a fixing assembly, a driving assembly, and a circuit assembly. The movable part is movable relative to the fixed assembly. The driving assembly is configured to drive the movable part to move relative to the fixed assembly to generate a feedback force. The circuit assembly is configured to be electrically connected to the driving assembly. The circuit assembly is electrically connected to an external circuit.

19 Claims, 10 Drawing Sheets

HAPTIC FEEDBACK SYSTEM

CROSS REFERENCE TO RELATED APPLICATIONS

This application claims the benefit of U.S. Provisional Application No. 63/137,968, filed Jan. 15, 2021, the entirety of which is incorporated by reference herein.

BACKGROUND OF THE DISCLOSURE

Field of the Disclosure

The present disclosure relates to a haptic feedback system, and in particular it relates to a haptic feedback system that can effectively transmit vibration.

Description of the Related Art

As technology has progressed, many kinds of electronic devices, such as tablet computers and smartphones, have been produced to include a vibration notification function. When performing a specific function, such an electronic device can vibrate, through the use of a built-in vibration device, in order to notify a user. For example, when the electronic device receives a message or the user presses a button on the electronic device, the electronic device can vibrate to notify the user that the message has been received or that the button has been pressed successfully.

However, current vibration modules cannot meet all the needs of users. Therefore, how to design a vibration module that can effectively transmit vibration to the button is a topic nowadays that need to be discussed and solved.

BRIEF SUMMARY OF THE DISCLOSURE

Accordingly, one objective of the present disclosure is to provide a haptic feedback system to solve the above problems.

According to some embodiments of the disclosure, a haptic feedback system is provided and includes a movable part, a fixing assembly, a driving assembly, and a circuit assembly. The movable part is movable relative to the fixed assembly. The driving assembly is configured to drive the movable part to move relative to the fixed assembly to generate a feedback force. The circuit assembly is configured to be electrically connected to the driving assembly. The circuit assembly is electrically connected to an external circuit.

According to some embodiments, the circuit assembly includes: a first contact, configured to be connected to an electronic component; a second contact, configured to be connected to the external circuit; a third contact, configured to be connected to the external circuit; a fourth contact, configured to be connected to the electronic component; and a fifth contact, configured to be connected to the external circuit. The electronic component is configured to output an input signal. The input signal is transmitted to the external circuit through the first contact and the second contact in sequence. The second contact extends along a first axis.

According to some embodiments, the circuit assembly further includes: a first circuit element, electrically connected to the first contact and the second contact; a second circuit element, electrically connected to the third contact; and a third circuit element, electrically connected to the fourth contact and the fifth contact. The first circuit element has a plate-shaped structure. A thickness of the first circuit element is greater than 0.03 mm. The first circuit element includes a first section, a second section and a third section. An extending direction of the first section is different from an extending direction of the second section. The extending direction of the second section is different from an extending direction of the third section. The extending direction of the third section is parallel to the extending direction of the first section.

According to some embodiments, the first contact is located on the first section. The second contact is located on the third section. The third contact extends along the first axis. The driving assembly is electrically connected to the third contact. The driving assembly is electrically connected to the external circuit via the second circuit element and the third contact.

According to some embodiments, the second contact and the third contact are arranged along a second axis. The second axis is perpendicular to the first axis. The first contact is electrically independent from the third contact. The fifth contact extends along the first axis. An extending direction of the fifth contact is opposite to an extending direction of the second contact. The electronic component is electrically connected to the fifth contact. The fifth contact is electrically independent from the third contact.

According to some embodiments, when viewed along a main axis, the haptic feedback system has a polygonal structure. The main axis is perpendicular to the first axis. The main axis is perpendicular to the second axis. When viewed along the main axis, the second contact is located on a first side of the haptic feedback systems. When viewed along the main axis, the third contact is located on the first side. When viewed along the main axis, the fifth contact is located on a second side of the haptic feedback system. The first contact is exposed on a first surface of the fixed assembly. The fourth contact is exposed on the first surface. The first surface is perpendicular to the main axis.

According to some embodiments, the fixed assembly further includes: a top wall, having a plate-shaped structure and perpendicular to the main axis; a first side wall, parallel to the main axis; a second side wall, parallel to the main axis; and a base, having a plate-shaped structure and parallel to the top wall. The first surface is located on the top wall. The first section is disposed on the top wall. At least a part of the first section is embedded in the top wall, and a part of the first section is exposed on the top wall. The second section is disposed in the first side wall. At least a part of the second section is embedded in the first side wall.

According to some embodiments, the haptic feedback system further includes: a first transmission element, configured to transmit the feedback force to the electronic component; and a second transmission element, configured to transmit the feedback force to the electronic component. The first transmission element is configured to be fixedly connected to the electronic component. A material of the first transmission element is different from a material of the top wall. The Young's modulus of the first transmission element is greater than the Young's modulus of the top wall. At least a portion of the first transmission element is embedded in and not exposed on the top wall. The first transmission element has a metal material. The top wall has a non-metal material.

According to some embodiments, the first transmission element has a plate-shaped structure. The first transmission element includes a fourth section and a fifth section. When viewed in a direction perpendicular to the main axis, the fourth section overlaps at least a part of the first section. At least a portion of the fourth section is embedded in and not exposed on the top wall. An extending direction of the fourth section is parallel to the extending direction of the first section.

According to some embodiments, when viewed along the main axis, an area of the fourth section is larger than an area of the first section. A thickness of the first transmission element is the same as a thickness of the first circuit element. The first transmission element is electrically independent from the first circuit element. When viewed along the main axis, the fifth section is located on the first side. When viewed along the second axis, an outer side surface of the second section and an outer side surface of the fifth section face the same direction and do not overlap each other. When viewed along the second axis, the second section does not overlap the fifth section.

According to some embodiments, the haptic feedback system further includes: a first elastic member, wherein the movable part is movably connected to the fixed assembly through the first elastic member; and a second elastic member, wherein the movable part is movably connected to the fixed assembly through the second elastic member. The first elastic member includes: a first fixed end, fixedly connected to the movable part; a second fixed end, fixedly connected to the first transmission element; and a first elastic portion, having flexibility, wherein the first fixed end is movable relative to the second fixed end through the first elastic portion.

According to some embodiments, the second fixed end is movable relative to the fixed assembly. The second fixed end is located between the fifth section and the first side wall. The first side wall has an opening structure configured to expose the second fixed end or the fifth section.

According to some embodiments, the haptic feedback system further includes: a first transmission point, located between the first elastic member and the first transmission element; and a second transmission point, located between the second elastic member and the second transmission element. When viewed along the main axis, the movable part is located between the first transmission point and the second transmission point. When viewed along the main axis, a connecting line of the first transmission point and the second transmission point passes through the movable part.

According to some embodiments, the second circuit element includes a sixth section. The driving assembly is electrically connected to the third contact through the sixth section. When viewed along the second axis, the first section does not overlap the sixth section. When viewed along the second axis, the movable part is located between the first section and the sixth section. When viewed along the main axis, the first section overlaps a portion of the movable part. When viewed along the main axis, the sixth section overlaps a portion of the movable part.

According to some embodiments, the first transmission element includes a first transmission portion fixedly connected to the electronic component. The first transmission portion is connected to the fifth section via the fourth section. An extending direction of the first transmission portion is different from the extending direction of the fourth section. The extending direction of the first transmission portion is parallel to the main axis.

According to some embodiments, the electronic component is fixedly disposed in the fixed assembly. The electronic component is fixedly disposed on the first surface. The haptic feedback system further includes an adhesive element configured to fix the electronic component and the fixed assembly. When viewed in a direction perpendicular to the first surface, the adhesive element surrounds the first contact.

According to some embodiments, the adhesive element directly contacts the fixed assembly. The adhesive element directly contacts the first surface. The adhesive element directly contacts the electronic component. The Young's modulus of the adhesive element is greater than 0.2 Gpa.

According to some embodiments, the haptic feedback system is configured to be disposed on an electronic device. A device surface of the electronic device has a feedback portion corresponding to a portion of the electronic component. The electronic component includes a first outer surface and a second outer surface. The first outer surface and the second outer surface face the same direction. At least a part of the first outer surface is exposed from the feedback portion. When viewed in a direction perpendicular to the device surface, the device surface overlaps at least a portion of the second outer surface.

According to some embodiments, in the direction perpendicular to the device surface, there is a gap between the first outer surface and the second outer surface. The haptic feedback system further includes a sealing element disposed in the gap. The sealing element is in direct contact with the electronic device. When viewed in the direction perpendicular to the device surface, the device surface overlaps at least a portion of the sealing element.

According to some embodiments, the electronic component further includes a third outer surface, and the third outer surface and the first outer surface facing the same direction. In a direction parallel to the device surface, the third outer surface is located between the first outer surface and the second outer surface. When viewed in the direction perpendicular to the device surface, the device surface overlaps the third outer surface. When viewed in the direction perpendicular to the device surface, the second outer surface is located between the first outer surface and the third outer surface.

The present disclosure provides a haptic feedback system including the movable part, the fixed assembly, the driving assembly and the circuit assembly. The driving assembly is configured to drive the movable part to move relative to the fixed part assembly to generate a feedback force. The circuit assembly can include a plurality of first circuit elements and a plurality of third circuit elements, which are embedded in the outer casing of the fixed assembly. The ends (the contacts) of the first circuit element and the third circuit element can be exposed from the top wall of the outer casing, so that the electronic component can be connected to the contacts (the first contact and the fourth contact) by welding, and therefore the electronic component can be affixed to the outer casing.

In addition, the haptic feedback system further has a first transmission element and a second transmission element made of a metal material, which are respectively connected to the movable part through the first elastic member and the second elastic member. Therefore, when the movable part repeatedly moves along the first axis, the generated feedback force can be effectively transmitted to the electronic component through the first transmission element and the second transmission element, thereby providing the user with a good touch feedback experience.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE ILLUSTRATIVE EMBODIMENTS

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly." "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 1:
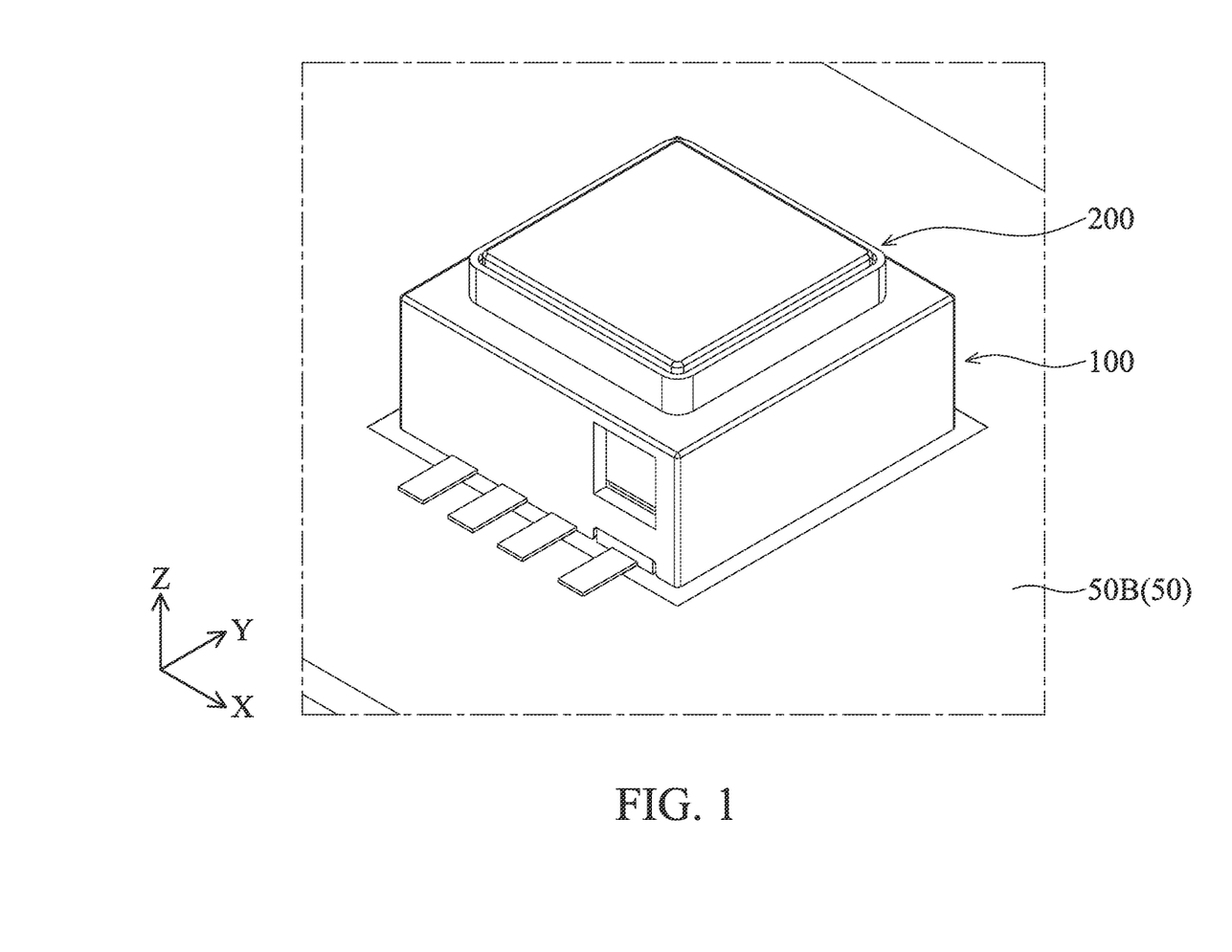
FIG. 1 is a schematic diagram of a haptic feedback system 100 and an electronic component 200 according to an embodiment of the present disclosure.
Figure 2:
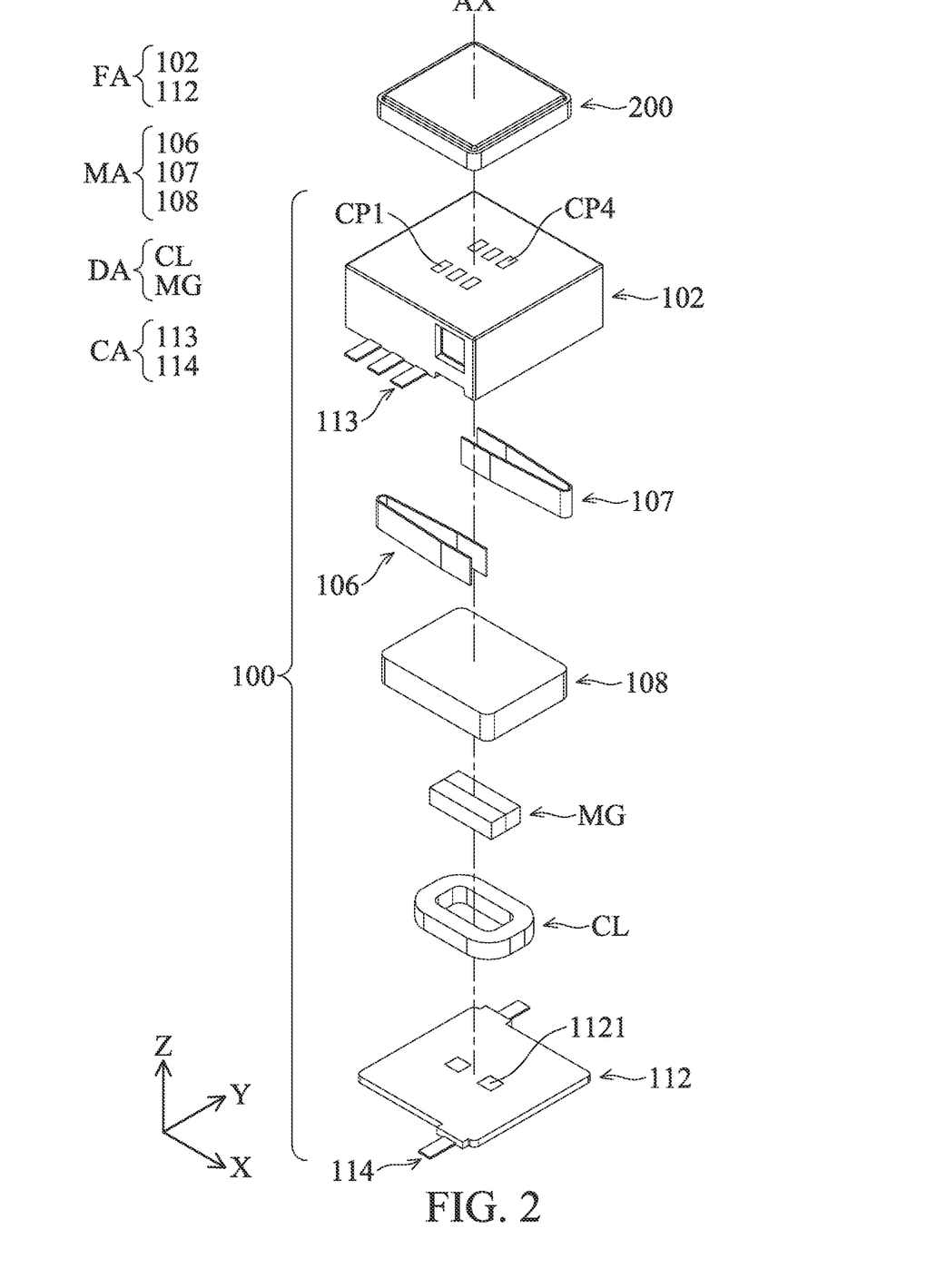
FIG. 2 is an exploded diagram of the haptic feedback system 100 according to an embodiment of the present disclosure.
Figure 3:
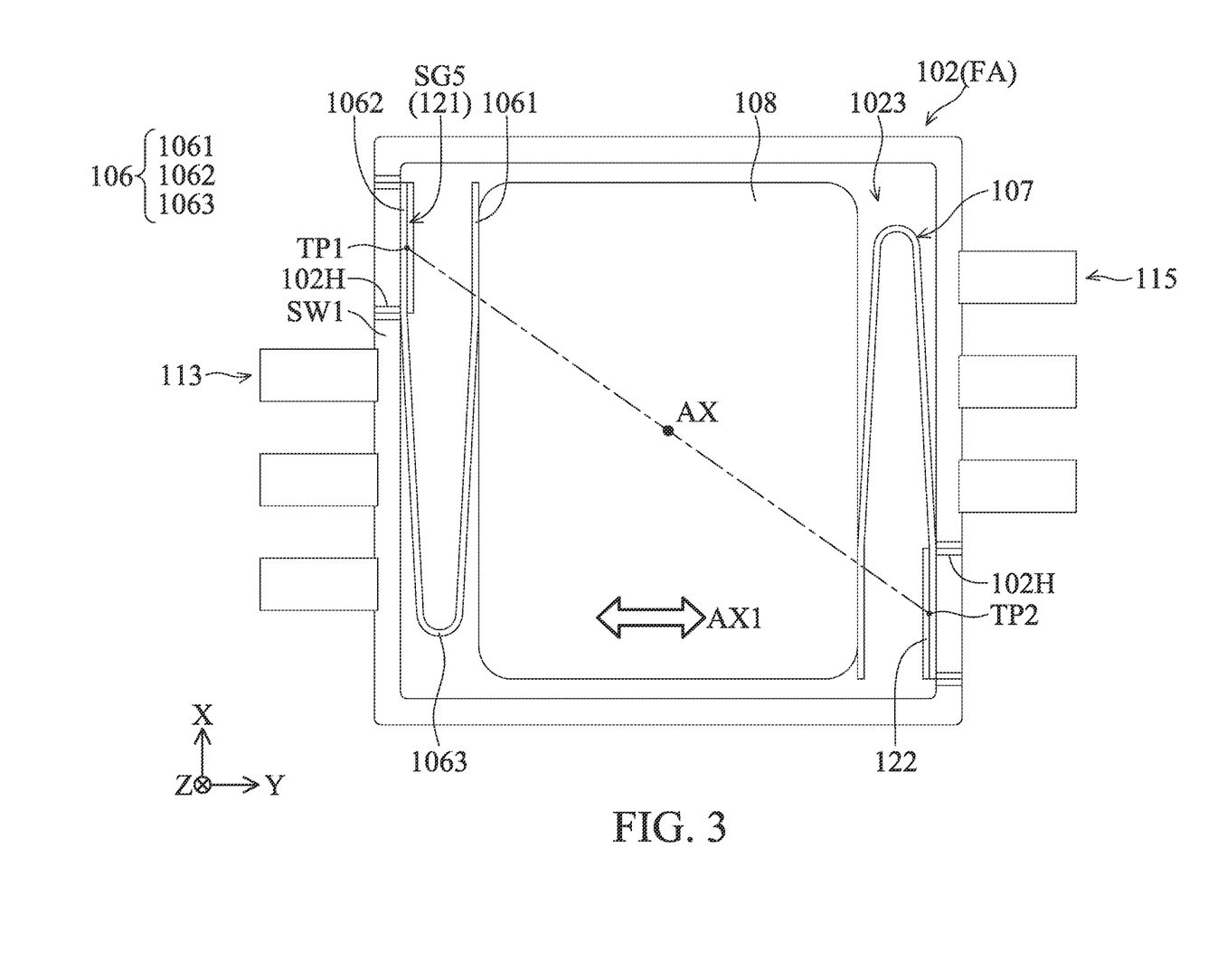
FIG. 3 is a bottom view of a partial structure of the haptic feedback system 100 according to an embodiment of the present disclosure.

Please refer to FIG. 1 to FIG. 3. FIG. 1 is a schematic diagram of a haptic feedback system 100 and an electronic component 200 according to an embodiment of the present disclosure, FIG. 2 is an exploded diagram of the haptic feedback system 100 according to an embodiment of the present disclosure, and FIG. 3 is a bottom view of a partial structure of the haptic feedback system 100 according to an embodiment of the present disclosure. The haptic feedback system 100 can be a vibration module installed on a main circuit board 50B of an electronic device 50, and the electronic component 200 is disposed on the haptic feedback system 100. The electronic component 200 can be, for example, a button, but it not limited thereto. In other embodiments, the electronic component 200 may also be a fingerprint reader, a screen, a speaker, and so on. When the electronic component 200 is touched by the user, the haptic feedback system 100 is configured to provide vibration feedback to the electronic component 200 for the user to obtain the function of haptic feedback.

In this embodiment, the haptic feedback system 100 may include a fixed assembly FA, a movable assembly MA, a driving assembly DA and a circuit assembly CA. The movable assembly MA may include a movable part 108, and the movable part 108 is movable relative to the fixed assembly FA. The driving assembly DA is configured to drive the movable part 108 to move relative to the fixed assembly FA to generate a feedback force. The circuit assembly CA is configured to be electrically connected to the driving assembly DA, and the circuit assembly CA can be electrically connected to an external circuit. The external circuit is, for example, the main circuit board 50B.

In this embodiment, as shown in FIG. 2, the fixed assembly FA includes an outer casing 102 and a base 112, the outer casing 102 is disposed on the base 112, and the outer casing 102 and the base 112 are arranged along a main axis AX. The outer casing 102 has a hollow structure, and the outer casing 102 and the base 112 can form an accommodating space 1023 (FIG. 3) for accommodating the movable assembly MA and the driving assembly DA.

As shown in FIG. 2 and FIG. 3, the movable assembly MA may further include a first elastic member 106 and a second elastic member 107, the movable part 108 is movably connected to the fixed assembly FA through the first elastic member 106, and the movable part 108 is movably connected to the fixed assembly FA through the second elastic member 107. In this embodiment, the first elastic member 106 and the second elastic member 107 are respectively connected to opposite sides of the movable part 108, so that the movable part 108 can be suspended in the accommodating space 1023.

In this embodiment, the driving assembly DA may include a magnet MG and a driving coil CL. The magnet MG is configured to be fixedly mounted on the bottom of the movable part 108, and the driving coil CL is fixedly disposed on the base 112. Two electrical contacts 1121 are disposed on the base 112 and are configured to be connected to two leading wires (not shown) of the driving coil CL, so that the driving coil CL is electrically connected to the circuit assembly CA.

For example, the driving coil CL is a winding coil whose winding axis can be parallel to the main axis AX. When the driving coil CL is energized, it can act with the magnet MG to generate an electromagnetic force to drive the movable part 108 to move back and forth repeatedly relative to the fixed assembly FA along a first axis AX1 so as to generate the feedback force.

Figure 4:
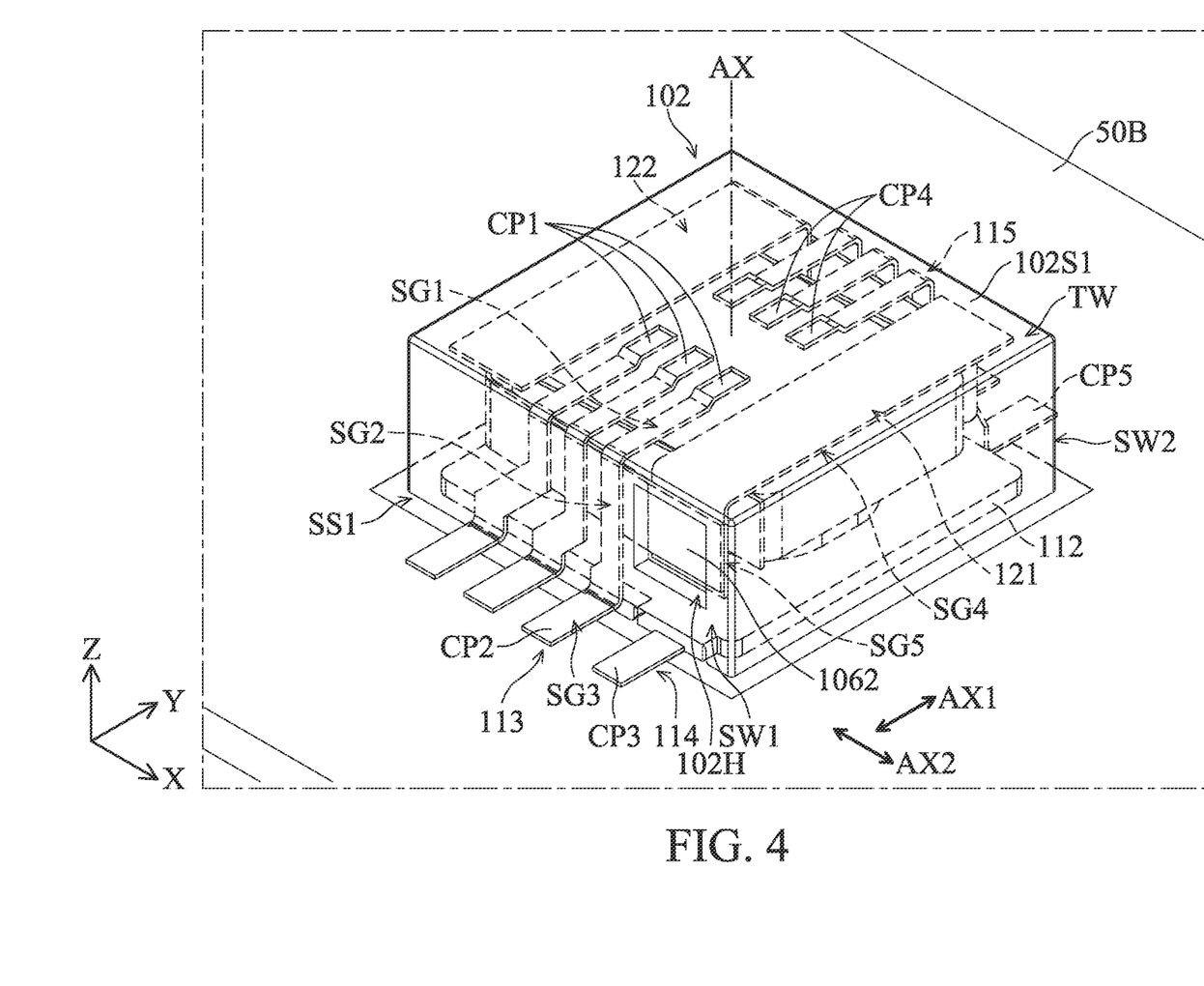
FIG. 4 is a perspective view of the haptic feedback system 100 according to an embodiment of the present disclosure.
Figure 5:
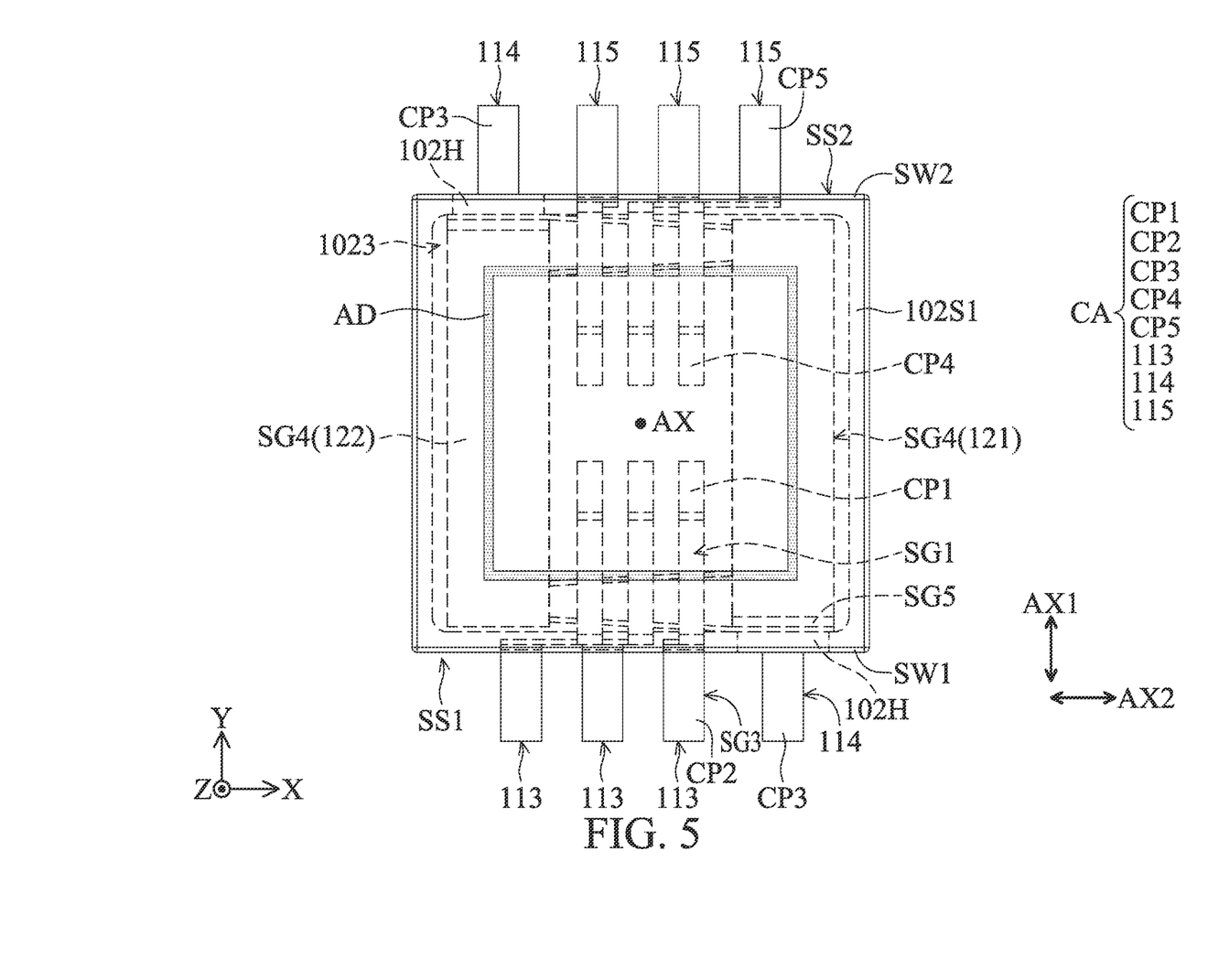
FIG. 5 is a top view of the haptic feedback system 100 according to an embodiment of the present disclosure.

Next, please refer to FIG. 1 to FIG. 5. FIG. 4 is a perspective view of the haptic feedback system 100 according to an embodiment of the present disclosure, and FIG. 5 is a top view of the haptic feedback system 100 according to an embodiment of the present disclosure. In this embodiment, the circuit assembly CA may include a first contact CP1, a second contact CP2, a third contact CP3, a fourth contact CP4, and a fifth contact CP5.

The first contact CP1 is configured to be connected to the electronic component 200, and the second contact CP2 is configured to be connected to the external circuit. Furthermore, the third contact CP3 is configured to be connected to the external circuit, the fourth contact CP4 is configured to be connected to the electronic component 200, and the fifth contact CP5 is configured to be connected to the external circuit.

The electronic component 200 is configured to output an input signal, and the input signal is transmitted to the external circuit through the first contact CP1 and the second contact CP2 in sequence. In addition, as shown in the figures, the second contact CP2, the third contact CP3, and the fifth contact CP5 each extend along the first axis AX1.

In addition, the circuit assembly CA may further include a plurality of circuit elements, which may be connected to the outer casing 102 by insert molding technology. For example, the outer casing 102 can be made of non-metallic material, such as a plastic material, and the circuit elements can be made of metal material.

In this embodiment, the circuit assembly CA may further include three first circuit elements 113, and each of the first circuit elements 113 is electrically connected to the corresponding first contact CP1 and the second contact CP2. Specifically, the first contact CP1 and the second contact CP2 are parts of the first circuit element 113.

In addition, the circuit assembly CA may also include three third circuit elements 115, and each of the third circuit element 115 is electrically connected to the corresponding fourth contact CP4 and the fifth contact CP5. Specifically, the fourth contact CP4 and the fifth contact CP5 are parts of the third circuit element 115. Furthermore, the circuit assembly CA may further include two second circuit elements 114 which are electrically connected to the third contact CP3. Specifically, the third contact CP3 is a part of the second circuit element 114.

As shown in FIG. 4 and FIG. 5, the first circuit element 113 has a plate-shaped structure, and the thickness of the first circuit element 113 is greater than 0.03 mm. The first circuit element 113 may include a first section SG1, a second section SG2 and a third section SG3. The extending direction of the first section SG1 is different from the extending direction of the second section SG2, the extending direction of the second section SG2 is different from the extending direction of the third section SG3, and the extending direction of the third section SG3 is parallel to the extending direction of the first section SG1.

The first contact CP1 is located on the first section SG1, and the second contact CP2 is located on the third section SG3. In addition, the third contact CP3 extends along the first axis AX1, and the driving assembly DA is electrically connected to the third contact CP3. Specifically, the driving assembly DA is electrically connected to the external circuit via the electrical contacts 1121, the second circuit elements 114 and the third contacts CP3.

As shown in FIG. 4, the second contact CP2 and the third contact CP3 are arranged along a second axis AX2, and the second axis AX2 is perpendicular to the first axis AX1. The first contact CP1 is electrically independent from the third contact CP3, and the second contact CP2 is electrically independent from the third contact CP3.

As shown in FIG. 5, the fifth contact CP5 extends along the first axis AX1, but the extending directions of the fifth contact CP5 and the second contact CP2 are opposite. Specifically, the fifth contact CP5 extends along the +Y-axis, and the second contact CP2 extends along the −Y-axis. In this embodiment, the electronic component 200 is electrically connected to the fifth contact CP5, the fifth contact CP5 is electrically independent from the third contact CP3, and the fourth contact CP4 is also electrically independent from the third contact CP3.

As shown in FIG. 5, when viewed along the main axis AX, the haptic feedback system 100 has a polygonal structure. For example, the haptic feedback system 100 has a rectangular structure. The main axis AX is perpendicular to the first axis AX1, and the main axis AX is perpendicular to the second axis AX2.

When viewed along the main axis AX, the second contact CP2 is located on a first side SS1 of the haptic feedback systems 100. When viewed along the main axis AX, the third contact CP3 is located on the first side SS1. When viewed along the main axis AX, the fifth contact CP5 is located on a second side SS2 of the haptic feedback system 100.

In addition, as shown in FIG. 4, the first contact CP1 is exposed on a first surface 102S1 of the outer casing 102 of the fixed assembly FA, the fourth contact CP4 is exposed on the first surface 102S1, and the first surface 102S1 is perpendicular to the main axis AX.

As shown in FIG. 4 and FIG. 5, the outer casing 102 of the fixed assembly FA includes a top wall TW, a first side wall SW1 and a second side wall SW2. The top wall TW has a plate-shaped structure and is perpendicular to the main axis AX. The first side wall SW1 is parallel to the main axis AX, and the second side wall SW2 is parallel to the main axis AX. In addition, the base 112 has a plate-shaped structure and is parallel to the top wall TW.

The first surface 102S1 is located on the top wall TW. The first section SG1 is disposed on the top wall TW, at least a part of the first section SG1 is embedded in the top wall TW, and a part of the first section SG1 is exposed on the top wall TW. The second section SG2 is disposed in the first side wall SW1, and at least a part of the second section SG2 is embedded in the first side wall SW1.

In this embodiment, the haptic feedback system 100 may further include a first transmission element 121 and a second transmission element 122. The first transmission element 121 is configured to transmit the feedback force to the electronic component 200, and the second transmission element 122 is configured to transmit the feedback force to the electronic component 200.

The first transmission element 121 and the second transmission element 122 are fixedly connected to the electronic component 200 in an indirect or direct manner. The material of the first transmission element 121 is different from the material of the top wall TW. For example, the first transmission element 121 is made of a metal material, and the top wall TW is made of a non-metal material, such as plastic material.

In this embodiment, the Young's modulus of the first transmission element 121 is greater than the Young's modulus of the top wall TW. Additionally, at least a portion of the first transmission element 121 is embedded in and not exposed on the top wall TW. Therefore, the first transmission element 121 and the second transmission element 122 can also be regarded as a part of the fixed assembly FA. It should be noted that the first transmission element 121 and the second transmission element 122 are symmetrically arranged.

Figure 6:
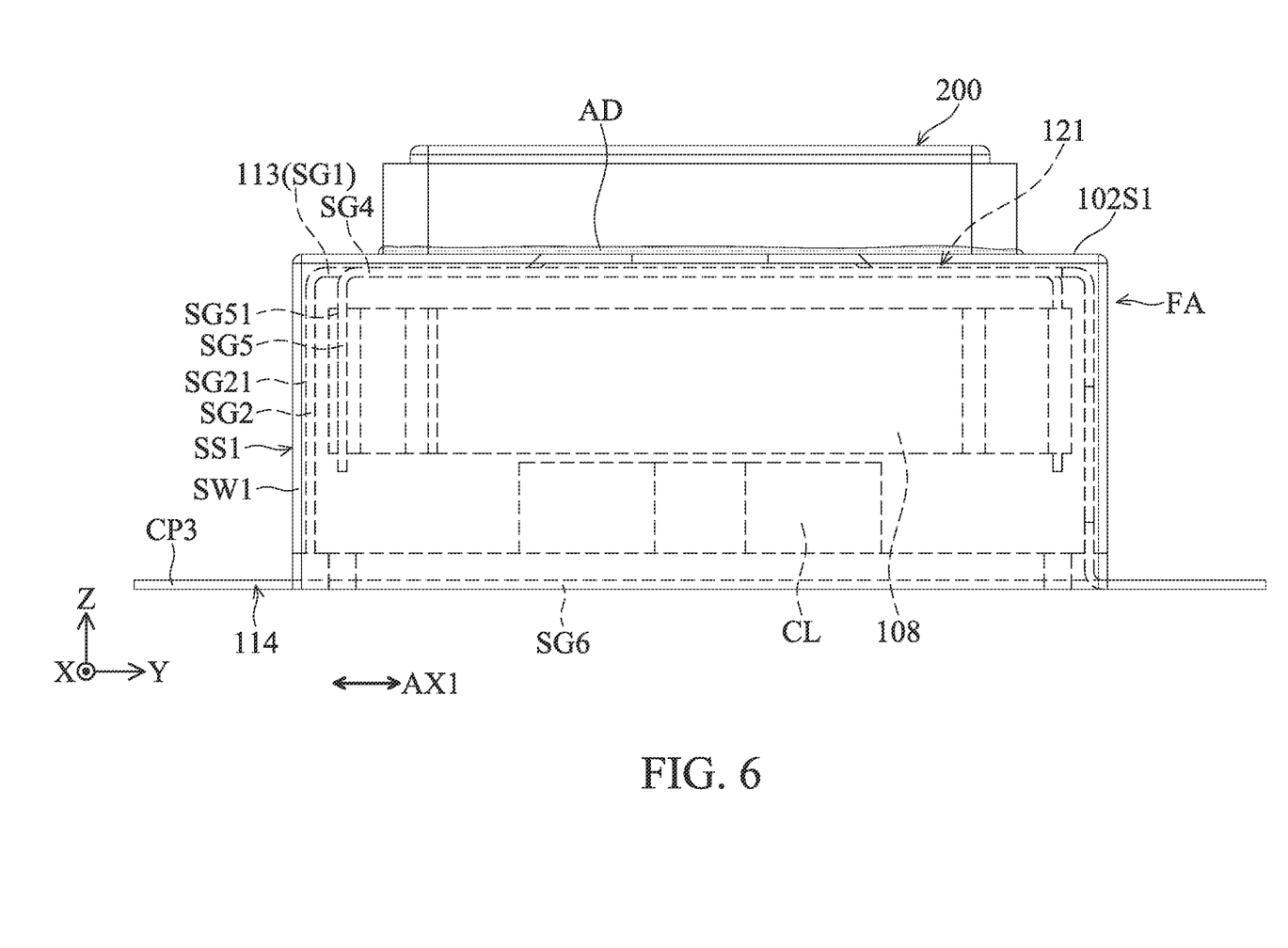
FIG. 6 is a side view of the haptic feedback system 100 and the electronic component 200 according to an embodiment of the present disclosure.

Please refer to FIG. 4 to FIG. 6. FIG. 6 is a side view of the haptic feedback system 100 and the electronic component 200 according to an embodiment of the present disclosure. The first transmission element 121 has a plate-shaped structure, and the first transmission element 121 may include a fourth section SG4 and a fifth section SG5. When viewed in a direction perpendicular to the main axis AX, as shown in FIG. 6, the fourth section SG4 overlaps at least a part of the first section SG1.

As shown in FIG. 4, at least a portion of the fourth section SG4 is embedded in and not exposed on the top wall TW. The extending direction of the fourth section SG4 is parallel to the extending direction of the first section SG1. Specifically, the fourth section SG4 and the first section SG1 both extend along the first axis AX1. In addition, as shown in FIG. 5, when viewed along the main axis AX, the area of the fourth section SG4 is larger than the area of the first section SG1.

In this embodiment, the thickness of the first transmission element 121 and the thickness of the first circuit element 113 may be the same, and the first transmission element 121 is electrically independent from the first circuit element 113. For example, the first transmission element 121 can be electrically grounded. In this embodiment, the fourth section SG4 is connected to the fifth section SG5, and the fourth section SG4 and the fifth section SG5 can be integrally formed. Furthermore, as shown in FIG. 5, when viewed along the main axis AX, the fifth section SG5 is located on the first side SS1.

As shown in FIG. 6, when viewed along the second axis AX2, an outer side surface SG21 of the second section SG2 and an outer side surface SG51 of the fifth section SG5 face the same direction and do not overlap each other. When viewed along the second axis AX2, the extending directions of the second section SG2 and the fifth section SG5 are the same, and the second section SG2 and the fifth section SG5 do not overlap.

Please return to FIG. 3 to FIG. 5. As shown in FIG. 3, the first elastic member 106 includes a first fixed end 1061, a second fixed end 1062 and a first elastic portion 1063. The first fixed end 1061 is fixedly connected to the movable part 108, the second fixed end 1062 is fixedly connected to the first transmission element 121, and the first elastic portion 1063 has flexibility. The first fixed end 1061 is movable relative to the second fixed end 1062 through the first elastic portion 1063.

Furthermore, the second fixed end 1062 is movable relative to the outer casing 102 of the fixed assembly FA. That is, the second fixed end 1062 is not affixed to the outer casing 102 but is affixed to the fifth section SG5. The second fixed end 1062 is located between the fifth section SG5 and the first side wall SW1. As shown in FIG. 4, the first side wall SW1 has an opening structure 102H configured to expose the second fixed end 1062 or the fifth section SG5. Based on the design of the opening structure 102H, the laser beam can pass through the opening structure 102H to weld the fifth section SG5 and the first transmission element 121.

It should be noted that because the first elastic member 106 and the second elastic member 107 are symmetrically arranged, the structural configuration of the second elastic member 107 and the relationship between the second elastic member 107 and other elements are omitted herein.

As shown in FIG. 3, the haptic feedback system 100 further includes a first transmission point TP1 and a second transmission point TP2. The first transmission point TP1 is located between the first elastic member 106 and the first transmission element 121, and the second transmission point TP2 is located between the second elastic member 107 and the second transmission element 122. When viewed along the main axis AX, the movable part 108 is located between the first transmission point TP1 and the second transmission point TP2. When viewed along the main axis AX, the connecting line of the first transmission point TP1 and the second transmission point TP2 passes through the movable part 108.

Figure 7:
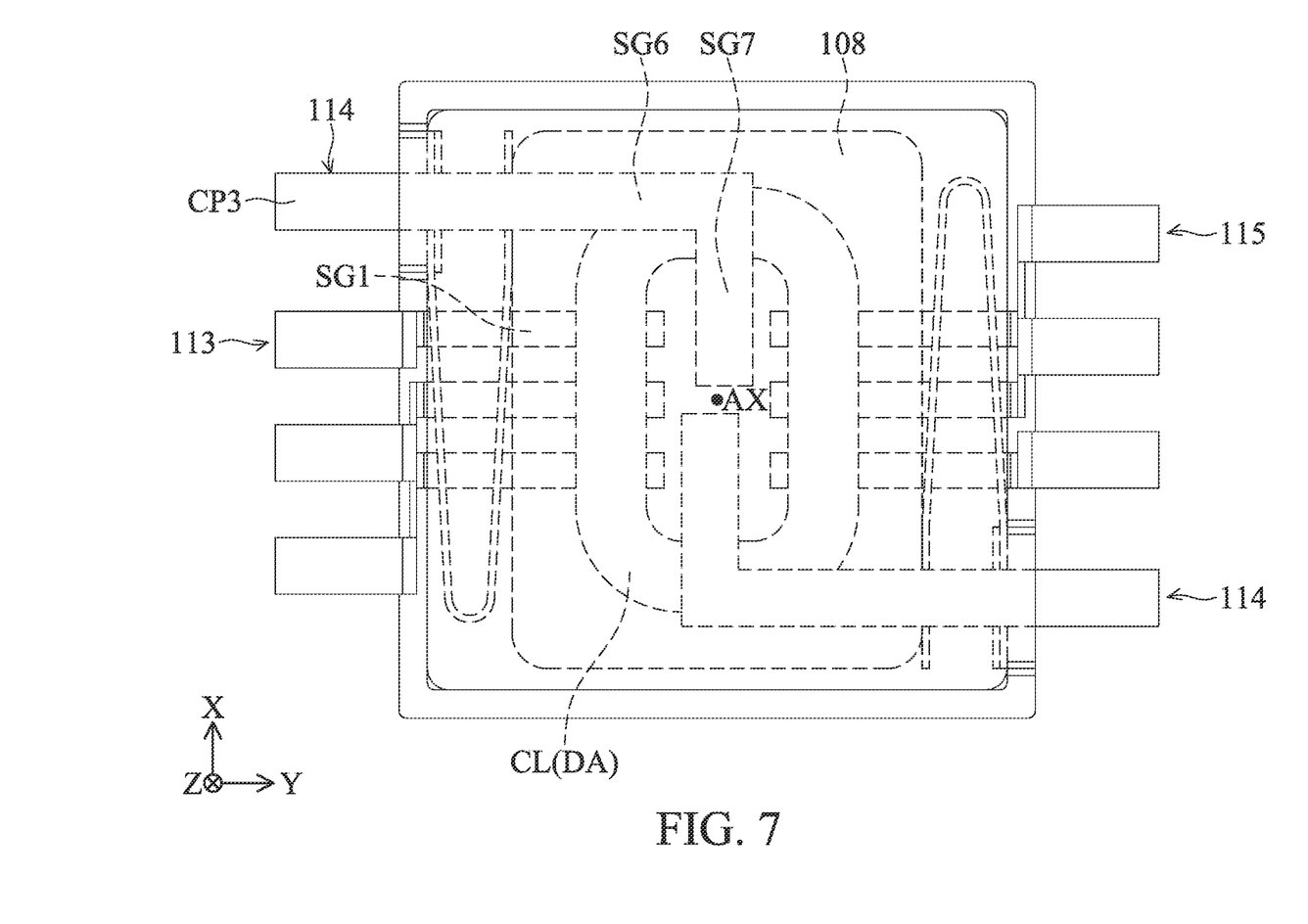
FIG. 7 is a bottom view of the haptic feedback system 100 according to an embodiment of the present disclosure.

Please refer to FIG. 6 and FIG. 7. FIG. 7 is a bottom view of the haptic feedback system 100 according to an embodiment of the present disclosure. As shown in FIG. 6 and FIG. 7, the second circuit element 114 includes a sixth section SG6 and a seventh section SG7. The seventh section SG7 is electrically connected to the electrical contact 1121, and the driving coil CL of the driving assembly DA is electrically connected to the third contact CP3 through the seventh section SG7 and the sixth section SG6.

As shown in FIG. 6, when viewed along the second axis AX2, the first section SG1 and the sixth section SG6 do not overlap. When viewed along the second axis AX2, the movable part 108 is located between the first section SG1 and the sixth section SG6. As shown in FIG. 7, when viewed along the main axis AX, the first section SG1 overlaps a portion of the movable part 108. When viewed along the main axis AX, the sixth section SG6 overlaps a portion of the movable part 108.

Figure 8:
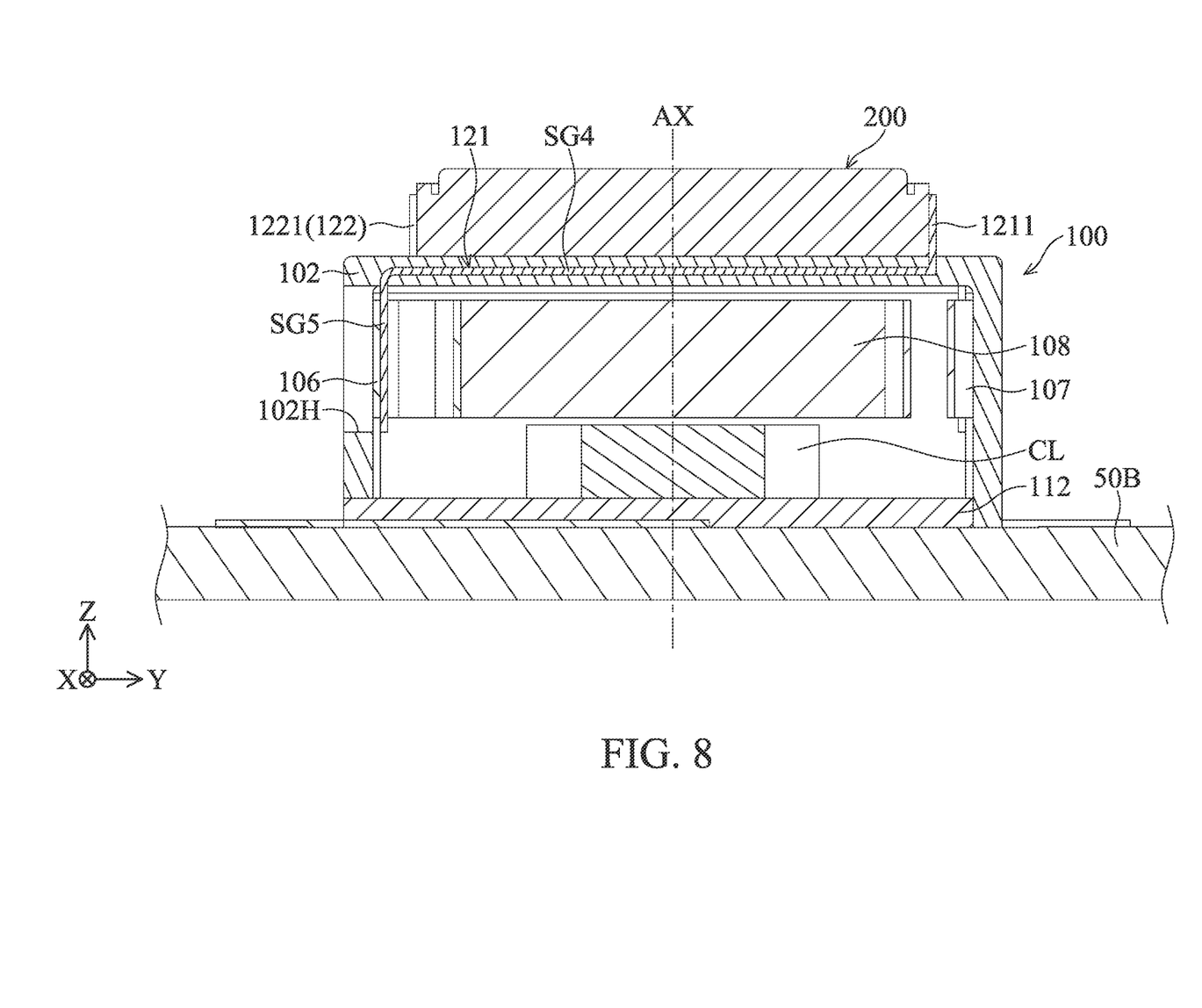
FIG. 8 is a cross-sectional view of the haptic feedback system 100 and the electronic component 200 along the YZ plane according to another embodiment of the present disclosure.

Please refer to FIG. 8, which is a cross-sectional view of the haptic feedback system 100 and the electronic component 200 along the YZ plane according to another embodiment of the present disclosure. In this embodiment, the first transmission element 121 may further include a first transmission portion 1211 fixedly connected to the electronic component 200. The first transmission portion 1211 is connected to the fifth section SG5 via the fourth section SG4, and then connected to the first elastic member 106 and the movable part 108.

The extending direction of the first transmission portion 1211 is different from the extending direction of the fourth section SG4, and the extending direction of the first transmission portion 1211 is parallel to the main axis AX. Specifically, the first transmission portion 1211 is protruded from the fourth section SG4 extending along the main axis AX, and a part of the first transmission portion 1211 is exposed from the outer casing 102 to be fixedly connected to the electronic component 200.

Similarly, the second transmission element 122 has a second transmission portion 1221 configured to be fixedly connected to the electronic component 200. Based on the design of the first transmission portion 1211 and the second transmission portion 1221, the feedback force generated by the movable part 108 can be effectively transmitted to the electronic component 200.

Figure 9:
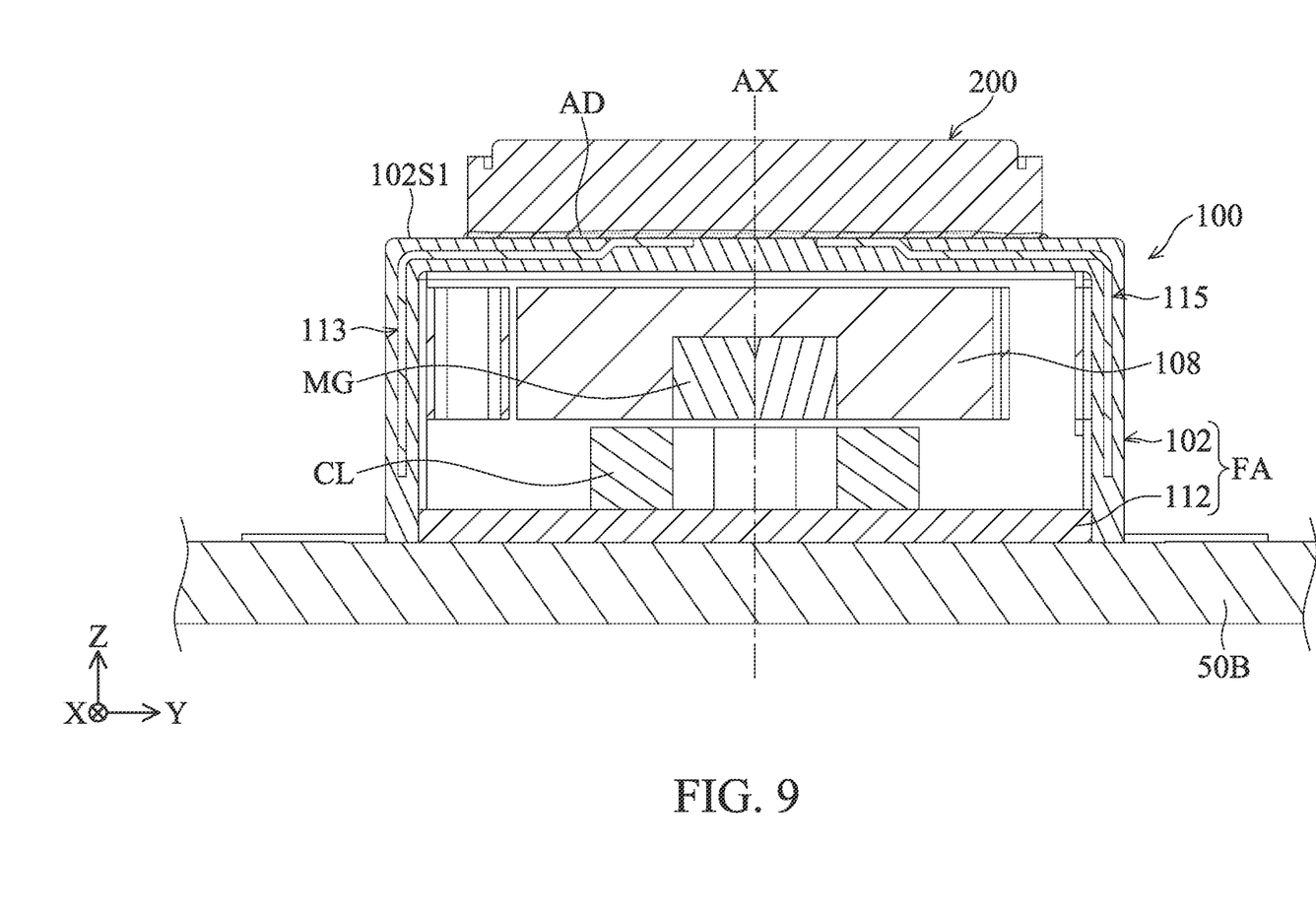
FIG. 9 is a cross-sectional view of the haptic feedback system 100 and the electronic component 200 along the YZ plane according to an embodiment of the present disclosure.

Please refer to FIG. 9 and FIG. 5. FIG. 9 is a cross-sectional view of the haptic feedback system 100 and the electronic component 200 along the YZ plane according to an embodiment of the present disclosure. As shown in FIG. 9, the electronic component 200 is fixedly disposed on the outer casing 102 of the fixed assembly FA. Specifically, the electronic component 200 is fixedly disposed on the first surface 102S1. Furthermore, the haptic feedback system 100 may further include an adhesive element AD configured to fix the electronic component 200 and the outer casing 102 of the fixed assembly FA.

As shown in FIG. 5, when viewed in a direction perpendicular to the first surface 102S1, such as along the main axis AX, the adhesive element AD surrounds the first contacts CP1 and the fourth contacts CP4. Specifically, the adhesive element AD directly contacts the outer casing 102 of the fixed assembly FA, and the adhesive element AD directly contacts the first surface 102S1. The adhesive element AD directly contacts the electronic component 200, and the Young's modulus of the adhesive element AD is greater than 0.2 Gpa. Therefore, the adhesive element AD can effectively transmit the feedback force to the electronic component 200.

Figure 10:
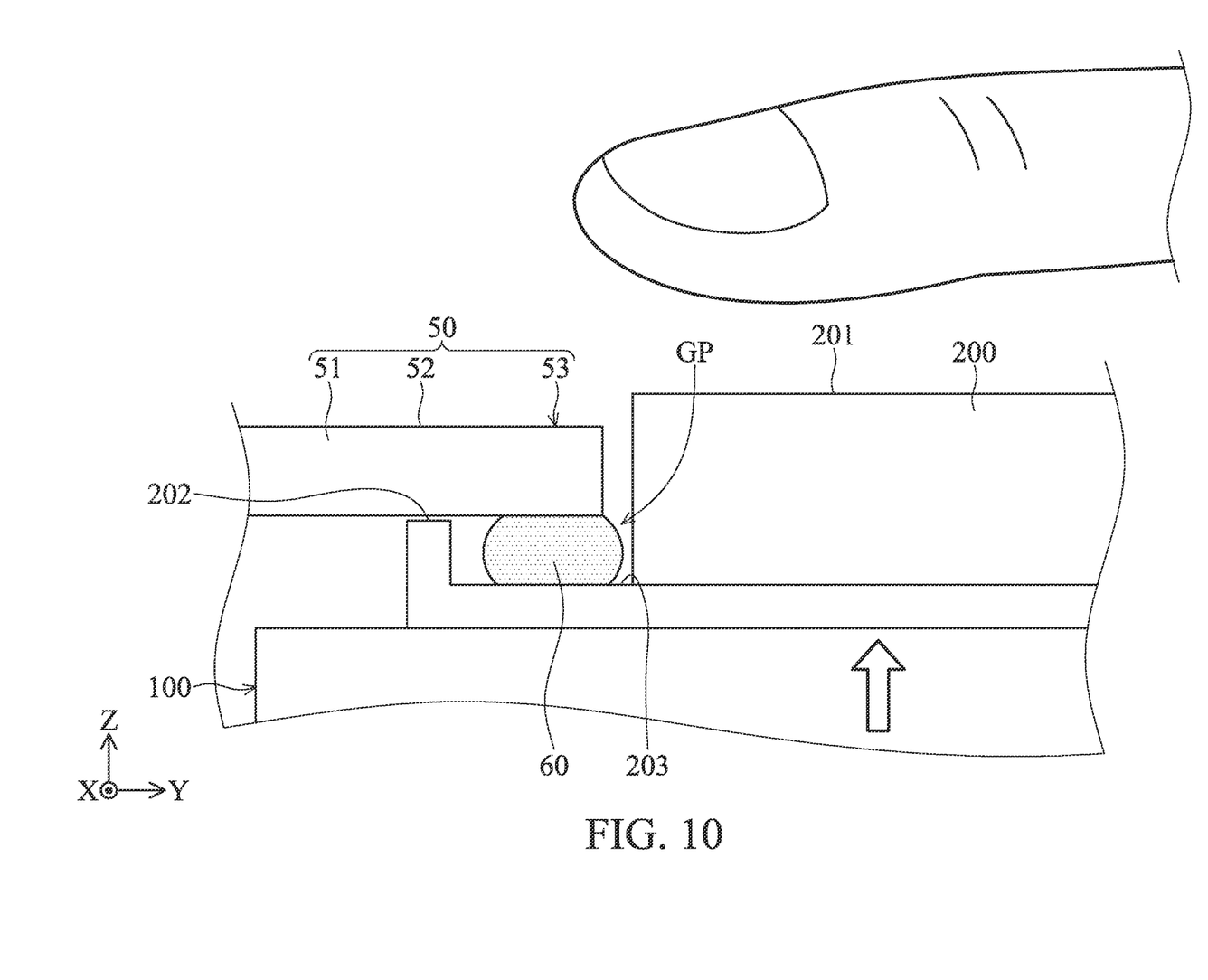
FIG. 10 is a schematic cross-sectional view of the haptic feedback system 100 and the electronic component 200 installed on the electronic device 50 according to an embodiment of the present disclosure.

Please refer to FIG. 10. FIG. 10 is a schematic cross-sectional view of the haptic feedback system 100 and the electronic component 200 installed on the electronic device 50 according to an embodiment of the present disclosure. The haptic feedback system 100 is configured to be disposed on the electronic device 50. Specifically, as shown in FIG. 10, the haptic feedback system 100 and the electronic component 200 are installed to the electronic device 50 in the direction of the arrow.

The electronic device 50 has a housing 51, and the housing 51 has a device surface 52 thereon. The device surface 52 may define a feedback portion 53 corresponding to a portion of the electronic component 200. Specifically, the feedback portion 53 is the portion which is touched by the user's finger. Furthermore, the electronic component 200 includes a first outer surface 201 and a second outer surface 202. The first outer surface 201 and the second outer surface 202 face the same direction (upward), and at least a part of the first outer surface 201 is exposed from the feedback portion 53.

When viewed in a direction perpendicular to the device surface 52, such as viewed along the Z-axis, the device surface 52 overlaps at least a portion of the second outer surface 202. In the direction perpendicular to the device surface 52 (the Z-axis), there is a gap GP between the first outer surface 201 and the second outer surface 202, and the gap GP is, for example, a groove. Furthermore, the haptic feedback system 100 further includes a sealing element 60 which is disposed in the gap GP. The sealing element 60 is, for example, a sealing ring or sealing glue, but it is not limited thereto.

In this embodiment, the sealing element 60 is in direct contact with the electronic device 50. For example, when viewed in the direction perpendicular to device surface 52, the device surface 52 overlaps at least a portion of the sealing element 60. In addition, the electronic component 200 further includes a third outer surface 203, and the third outer surface 203 and the first outer surface 201 face the same direction.

In a direction parallel to the device surface 52, such as in the Y-axis, the third outer surface 203 is located between the first outer surface 201 and the second outer surface 202. When viewed in the direction perpendicular to the device surface 52, the device surface 52 overlaps the third outer surface 203. Furthermore, when viewed in the direction perpendicular to the device surface 52, the second outer surface 202 is located between the first outer surface 201 and the third outer surface 203.

Based on the configuration of the sealing element 60 and the electronic component 200, the waterproof and dustproof function can be effectively achieved, and the haptic feedback system 100 and the electronic component 200 can be prevented from being damaged.

The present disclosure provides a haptic feedback system including the movable part, the fixed assembly, the driving assembly and the circuit assembly. The driving assembly is configured to drive the movable part to move relative to the fixed part assembly to generate a feedback force. The circuit assembly can include a plurality of first circuit elements and a plurality of third circuit elements, which are embedded in the outer casing of the fixed assembly. The ends (the contacts) of the first circuit element and the third circuit element can be exposed from the top wall of the outer casing, so that the electronic component can be connected to the contacts (the first contact and the fourth contact) by welding, and therefore the electronic component can be affixed to the outer casing.

In addition, the haptic feedback system further has a first transmission element and a second transmission element made of a metal material, which are respectively connected to the movable part through the first elastic member and the second elastic member. Therefore, when the movable part repeatedly moves along the first axis, the generated feedback force can be effectively transmitted to the electronic component through the first transmission element and the second transmission element, thereby providing the user with a good touch feedback experience.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A haptic feedback system, comprising:
a movable part;
a fixing assembly, wherein the movable part is movable relative to the fixed assembly;
a driving assembly, configured to drive the movable part to move relative to the fixed assembly to generate a feedback force; and
a circuit assembly, configured to be electrically connected to the driving assembly;
wherein the circuit assembly is electrically connected to an external circuit,
wherein the circuit assembly includes:
a first contact, configured to be connected to an electronic component;
a second contact, configured to be connected to the external circuit;
a third contact, configured to be connected to the external circuit;
a fourth contact, configured to be connected to the electronic component; and
a fifth contact, configured to be connected to the external circuit;
the electronic component is configured to output an input signal;
the input signal is transmitted to the external circuit through the first contact and the second contact in sequence;
the second contact extends along a first axis.

2. The haptic feedback system as claimed in claim 1, wherein
the circuit assembly further includes:
a first circuit element, electrically connected to the first contact and the second contact;
a second circuit element, electrically connected to the third contact; and
a third circuit element, electrically connected to the fourth contact and the fifth contact;
the first circuit element has a plate-shaped structure;
a thickness of the first circuit element is greater than 0.03 mm;
the first circuit element includes a first section, a second section and a third section;
an extending direction of the first section is different from an extending direction of the second section;
the extending direction of the second section is different from an extending direction of the third section;
the extending direction of the third section is parallel to the extending direction of the first section.

3. The haptic feedback system as claimed in claim 2, wherein
the first contact is located on the first section;
the second contact is located on the third section;
the third contact extends along the first axis;
the driving assembly is electrically connected to the third contact;
the driving assembly is electrically connected to the external circuit via the second circuit element and the third contact.

4. The haptic feedback system as claimed in claim 3, wherein
the second contact and the third contact are arranged along a second axis;
the second axis is perpendicular to the first axis;
the first contact is electrically independent from the third contact;
the fifth contact extends along the first axis;
an extending direction of the fifth contact is opposite to an extending direction of the second contact;
the electronic component is electrically connected to the fifth contact;
the fifth contact is electrically independent from the third contact.

5. The haptic feedback system as claimed in claim 4, wherein when viewed along a main axis, the haptic feedback system has a polygonal structure;
the main axis is perpendicular to the first axis;
the main axis is perpendicular to the second axis;
when viewed along the main axis, the second contact is located on a first side of the haptic feedback systems;
when viewed along the main axis, the third contact is located on the first side;
when viewed along the main axis, the fifth contact is located on a second side of the haptic feedback system;
the first contact is exposed on a first surface of the fixed assembly;
the fourth contact is exposed on the first surface;
the first surface is perpendicular to the main axis.

6. The haptic feedback system as claimed in claim 5, wherein
the fixed assembly further includes:
a top wall, having a plate-shaped structure and perpendicular to the main axis;
a first side wall, parallel to the main axis;
a second side wall, parallel to the main axis; and
a base, having a plate-shaped structure and parallel to the top wall;
the first surface is located on the top wall;
the first section is disposed on the top wall;
at least a part of the first section is embedded in the top wall, and a part of the first section is exposed on the top wall;
the second section is disposed in the first side wall;
at least a part of the second section is embedded in the first side wall.

7. The haptic feedback system as claimed in claim 6, wherein the haptic feedback system further includes:
a first transmission element, configured to transmit the feedback force to the electronic component; and
a second transmission element, configured to transmit the feedback force to the electronic component;
the first transmission element is configured to be fixedly connected to the electronic component;
a material of the first transmission element is different from a material of the top wall;
the Young's modulus of the first transmission element is greater than the Young's modulus of the top wall;
at least a portion of the first transmission element is embedded in and not exposed on the top wall;
the first transmission element has a metal material;
the top wall has a non-metal material.

8. The haptic feedback system as claimed in claim 7, wherein the first transmission element has a plate-shaped structure;
the first transmission element includes a fourth section and a fifth section;
when viewed in a direction perpendicular to the main axis, the fourth section overlaps at least a part of the first section;
at least a portion of the fourth section is embedded in and not exposed on the top wall;
an extending direction of the fourth section is parallel to the extending direction of the first section.

9. The haptic feedback system as claimed in claim 8, wherein
when viewed along the main axis, an area of the fourth section is larger than an area of the first section;
a thickness of the first transmission element is the same as a thickness of the first circuit element;
the first transmission element is electrically independent from the first circuit element;
when viewed along the main axis, the fifth section is located on the first side;
when viewed along the second axis, an outer side surface of the second section and an outer side surface of the fifth section face the same direction and do not overlap each other;
when viewed along the second axis, the second section does not overlap the fifth section.

10. The haptic feedback system as claimed in claim 9, wherein the haptic feedback system further includes:
a first elastic member, wherein the movable part is movably connected to the fixed assembly through the first elastic member; and
a second elastic member, wherein the movable part is movably connected to the fixed assembly through the second elastic member;
the first elastic member includes:
a first fixed end, fixedly connected to the movable part;
a second fixed end, fixedly connected to the first transmission element; and
a first elastic portion, having flexibility, wherein the first fixed end is movable relative to the second fixed end through the first elastic portion.

11. The haptic feedback system as claimed in claim 10, wherein
the second fixed end is movable relative to the fixed assembly;
the second fixed end is located between the fifth section and the first side wall;
the first side wall has an opening structure configured to expose the second fixed end or the fifth section.

12. The haptic feedback system as claimed in claim 11, wherein
the haptic feedback system further includes:
a first transmission point, located between the first elastic member and the first transmission element; and
a second transmission point, located between the second elastic member and the second transmission element;
when viewed along the main axis, the movable part is located between the first transmission point and the second transmission point;
when viewed along the main axis, a connecting line of the first transmission point and the second transmission point passes through the movable part.

13. The haptic feedback system as claimed in claim 12, wherein
the second circuit element includes a sixth section;
the driving assembly is electrically connected to the third contact through the sixth section;
when viewed along the second axis, the first section does not overlap the sixth section;
when viewed along the second axis, the movable part is located between the first section and the sixth section;
when viewed along the main axis, the first section overlaps a portion of the movable part;
when viewed along the main axis, the sixth section overlaps a portion of the movable part.

14. The haptic feedback system as claimed in claim 13, wherein
the first transmission element includes a first transmission portion fixedly connected to the electronic component;
the first transmission portion is connected to the fifth section via the fourth section;
an extending direction of the first transmission portion is different from the extending direction of the fourth section;
the extending direction of the first transmission portion is parallel to the main axis.

15. The haptic feedback system as claimed in claim 14, wherein
the electronic component is fixedly disposed in the fixed assembly;
the electronic component is fixedly disposed on the first surface;
the haptic feedback system further includes an adhesive element configured to fix the electronic component and the fixed assembly;
when viewed in a direction perpendicular to the first surface, the adhesive element surrounds the first contact.

16. The haptic feedback system as claimed in claim 15, wherein
the adhesive element directly contacts the fixed assembly;
the adhesive element directly contacts the first surface;
the adhesive element directly contacts the electronic component;
the Young's modulus of the adhesive element is greater than 0.2 Gpa.

17. The haptic feedback system as claimed in claim 16, wherein
the haptic feedback system is configured to be disposed on an electronic device;
a device surface of the electronic device has a feedback portion corresponding to a portion of the electronic component;
the electronic component includes a first outer surface and a second outer surface;
the first outer surface and the second outer surface face the same direction;
at least a part of the first outer surface is exposed from the feedback portion;
when viewed in a direction perpendicular to the device surface, the device surface overlaps at least a portion of the second outer surface.

18. The haptic feedback system as claimed in claim 17, wherein
in the direction perpendicular to the device surface, there is a gap between the first outer surface and the second outer surface;
the haptic feedback system further includes a sealing element disposed in the gap;
the sealing element is in direct contact with the electronic device;
when viewed in the direction perpendicular to the device surface, the device surface overlaps at least a portion of the sealing element.

19. The haptic feedback system as claimed in claim 18, wherein
- the electronic component further includes a third outer surface, and the third outer surface and the first outer surface facing the same direction;
- in a direction parallel to the device surface, the third outer surface is located between the first outer surface and the second outer surface;
- when viewed in the direction perpendicular to the device surface, the device surface overlaps the third outer surface;
- when viewed in the direction perpendicular to the device surface, the second outer surface is located between the first outer surface and the third outer surface.

* * * * *